US010489394B2

(12) United States Patent
Schroetel et al.

(10) Patent No.: US 10,489,394 B2
(45) Date of Patent: *Nov. 26, 2019

(54) DATABASE QUERY CALCULATION USING AN OPERATOR THAT EXPLICITLY REMOVES GROUP-BY CHARACTERISTICS

(71) Applicant: SAP SE, Walldorf (DE)

(72) Inventors: Sebastian Schroetel, Walldorf (DE); Stefan Dipper, Wiesloch (DE); Michael Wilking, Walldorf (DE); Christof Mueller, Walldorf (DE)

(73) Assignee: SAP SE, Walldorf (DE)

( * ) Notice: Subject to any disclaimer, the term of this patent is extended or adjusted under 35 U.S.C. 154(b) by 70 days.

This patent is subject to a terminal disclaimer.

(21) Appl. No.: 15/164,432

(22) Filed: May 25, 2016

(65) Prior Publication Data

US 2016/0267129 A1    Sep. 15, 2016

Related U.S. Application Data

(63) Continuation of application No. 13/920,968, filed on Jun. 18, 2013, now Pat. No. 9,378,264.

(51) Int. Cl.
*G06F 16/00* (2019.01)
*G06F 16/242* (2019.01)
(Continued)

(52) U.S. Cl.
CPC .......... *G06F 16/244* (2019.01); *G06F 16/221* (2019.01); *G06F 16/24556* (2019.01); *G06F 16/283* (2019.01); *G06F 16/9535* (2019.01)

(58) Field of Classification Search
CPC ......... G06F 17/30592; G06F 17/30011; G06F 17/30448; G06F 16/244; G06F 16/221;
(Continued)

(56) References Cited

U.S. PATENT DOCUMENTS 6,275,818 B1    8/2001  Subramanian et al.
6,691,101 B2    2/2004  MacNicol et al.
(Continued)

OTHER PUBLICATIONS

Stackoverflow, "How can I filter an SQL query with a Group by clause", <https://stackoverflow.com/questions/12424127/how-can-i-filter-an-sql-query-with-a-group-by-clause#>, 1 page. Sep. 14, 2012.*

*Primary Examiner* — Monica M Pyo
(74) *Attorney, Agent, or Firm* — Fountainhead Law Group

(57) ABSTRACT

In one embodiment, a method receives a query for analyzing data in a database. The query includes a first level calculation that is performed before a second level calculation. When an operator associated with the first level calculation is present in the query, the method performs: calculating the first level calculation by removing group by information for a reference characteristic for the first level calculation to determine a first level calculation result and calculating the second level calculation using the first level calculation result using the group by information for the reference characteristic to determine a second level calculation result, wherein the group by in the second level calculation combines groups of rows in a database table of the database that have the same content in their specified columns.

20 Claims, 10 Drawing Sheets

(51) Int. Cl.
*G06F 16/22* (2019.01)
*G06F 16/28* (2019.01)
*G06F 16/9535* (2019.01)
*G06F 16/2455* (2019.01)

(58) Field of Classification Search
CPC ........... G06F 16/24556; G06F 16/9535; G06F 16/283
USPC .................................................. 707/602, 603
See application file for complete search history.

(56) References Cited

U.S. PATENT DOCUMENTS

| | | |
|---|---|---|
| 6,757,677 B2 | 6/2004 | Pham et al. |
| 6,842,753 B2 | 1/2005 | Chaudhuri et al. |
| 7,089,266 B2 | 8/2006 | Stolle et al. |
| 7,191,181 B2 | 3/2007 | Chaudhuri et al. |
| 7,343,366 B2 | 3/2008 | Miao et al. |
| 7,415,474 B1 | 8/2008 | Mitra et al. |
| 8,209,322 B2 | 6/2012 | Ahmed |
| 8,290,933 B2 | 10/2012 | Miao et al. |
| 8,396,886 B1 | 3/2013 | Tsimelzon et al. |
| 9,737,447 B2 * | 8/2017 | Barnes ................. A61G 3/0808 |
| 2005/0235020 A1* | 10/2005 | Gabelmann ............ G06Q 10/06 |
| 2007/0239691 A1 | 10/2007 | Ordonez |
| 2008/0016031 A1* | 1/2008 | Miao ................. G06F 17/30454 |
| 2009/0327199 A1 | 12/2009 | Weber et al. |
| 2010/0161677 A1 | 6/2010 | Zurek et al. |
| 2012/0011144 A1 | 1/2012 | Transier et al. |
| 2012/0130942 A1* | 5/2012 | Dipper ............. G06F 17/30436 707/602 |
| 2013/0166522 A1 | 6/2013 | Kaufmann et al. |
| 2014/0372368 A1 | 12/2014 | Schroetel et al. |

\* cited by examiner

302 —

314 —

| Country | Customer | Month | Net Sales |
|---|---|---|---|
| US | Peter | January | 100 $ |
| US | Andi | February | 50 $ |
| DE | Peter | March | 70 $ |
| DE | Stefan | January | 30 $ |
| DE | Andi | March | 20 $ |

304 —

306 — 310 — 316 — 318 —

| Country | Net Sales | Number of Customers | AVG Sales per Customer | Number of Customers in January |
|---|---|---|---|---|
| DE | 120 $ | 3 | 40 $ | 1 |
| US | 150 $ | 2 | 75 $ | 1 |
| Total | 270 $ | 3 | 90 $ | 2 |

$$\underbrace{\text{SUM( Revenue > FIX( 0.01 * (Revenue CS Product)}}_{602} \overbrace{\text{) ) over Product}}^{604}$$
$$)$$
$$606$$

FIG. 6A

(Admete)   450 EUR   > 0.01 * SUM ( 100.000 EUR )  ⟵ 608

(Agam)     1200 EUR  > 0.01 * SUM ( 100.000 EUR )
)
608

FIG. 6B

| Product | Revenue | Revenue CS Product | 1% of Revenue CS Product | Revenue > 1% of Revenue CS Product | |
|---|---|---|---|---|---|
| Admete | 450 EUR | 100.000 EUR | 1000 EUR | 0 | ⟵ 620 |
| Agam | 1200 EUR | 100.000 EUR | 1000 EUR | 1 | ⟵ 622 |
| Grand Total | 1650 EUR | 100.000 EUR | 1000 EUR | 1 | ⟵ 624 |

610 (Revenue CS Product column), 614, 612, 616, 618

FIG. 6C

| Calmonth | Product | Revenue | Revenue CS Product | 1% of Revenue CS Product | Revenue > 1% of Revenue CS Product | Revenue > 1% of Revenue CS Product over Calmonth |
|---|---|---|---|---|---|---|
| 04.2004 | Admete | 40 EUR | 8.000 EUR | 80 EUR | 0 | 0 |
| | Agam | 120 EUR | 8.000 EUR | 80 EUR | 1 | 1 |
| | Total | 160 EUR | 8.000 EUR | 80 EUR | 1 | 1 |
| 05.2004 | Admete | 20 EUR | 10.000 EUR | 100 EUR | 0 | 0 |
| | Agam | 320 EUR | 10.000 EUR | 100 EUR | 1 | 1 |
| | Total | 340 EUR | 10.000 EUR | 100 EUR | 1 | 1 |
| Grand Total | | 500 EUR | 18.000 EUR | 180 EUR | 1 | 2 |

SUM( SUM( Revenue > FIX( 0.01 * (Revenue CS Product) ) over Product )
over Calmonth

| Calmonth | Product | Revenue | Revenue CS Product, Calmonth | 1‰ of Revenue CS Product, Calmonth | Revenue > 1‰ of Revenue CS Product, Calmonth |
|---|---|---|---|---|---|
| 04.2004 | Admete | 40 EUR | 100.000 EUR | 100 EUR | 0 |
|  | Agam | 120 EUR | 100.000 EUR | 100 EUR | 1 |
|  | Total | 160 EUR | 100.000 EUR | 100 EUR | 1 |
| 05.2004 | Admete | 20 EUR | 100.000 EUR | 100 EUR | 0 |
|  | Agam | 320 EUR | 100.000 EUR | 100 EUR | 1 |
|  | Total | 340 EUR | 100.000 EUR | 100 EUR | 1 |
| Grand Total |  | 500 EUR | 100.000 EUR | 100 EUR | 2 |

SUM( Revenue > FIX( 0.001 * (Revenue CS Product, Calmonth) ) over Product, Calmonth

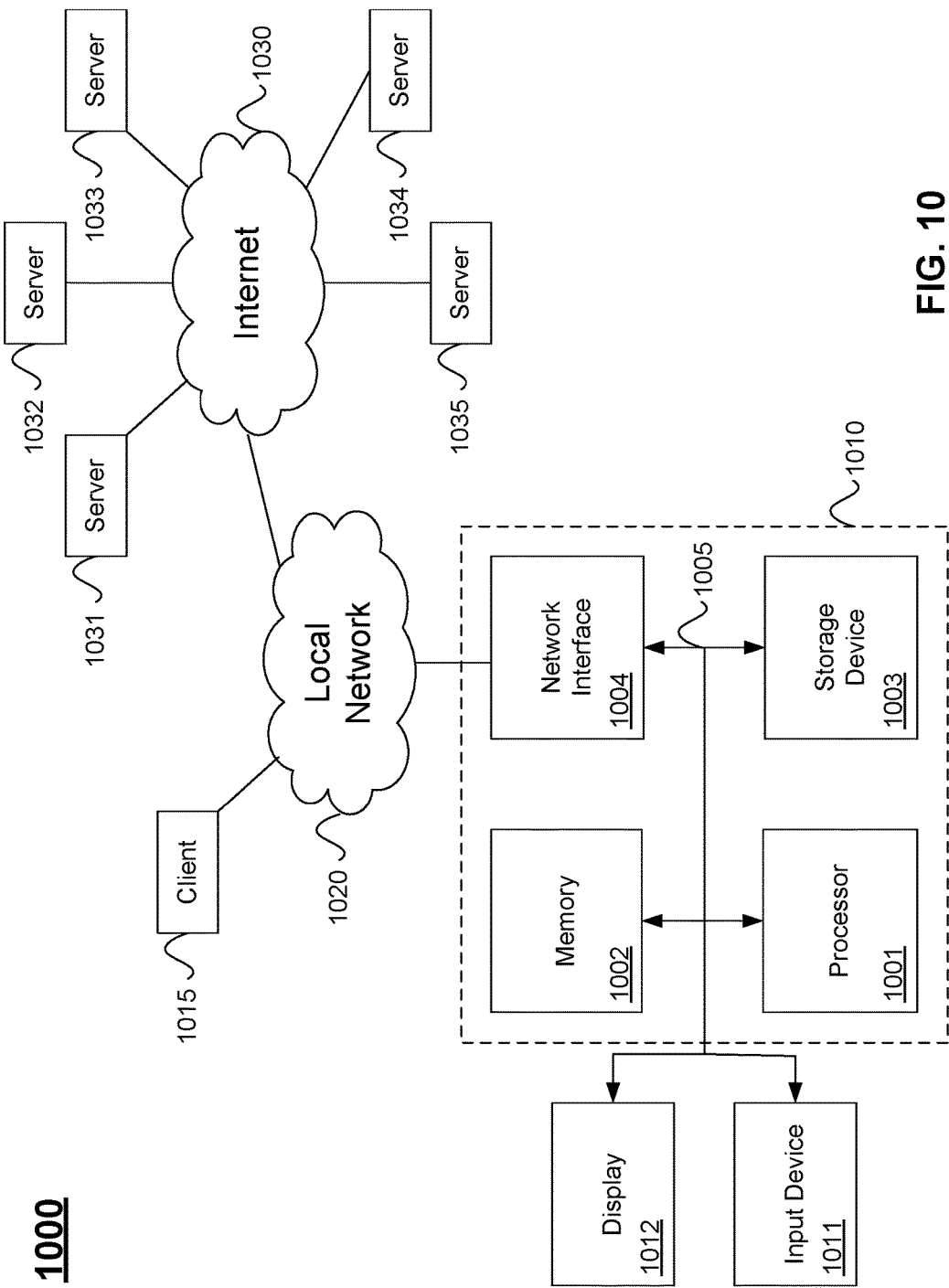

DATABASE QUERY CALCULATION USING AN OPERATOR THAT EXPLICITLY REMOVES GROUP-BY CHARACTERISTICS

CROSS REFERENCE TO RELATED APPLICATIONS

The present disclosure claims priority to U.S. patent application Ser. No. 13/920,968, entitled "Removing Group-By Characteristics in Formula Exception Aggregation", filed Jun. 18, 2013, the contents of which is incorporated herein by reference in its entirety.

BACKGROUND

When analyzing data stored in a database, due to the way the database rules are formulated, a user may not receive the expected results that the user desires for a query. For example, a user may want to do an "ABC" classification of the company's products. The user creates a query with a key figure (a measure or a value/quantity field that has a restriction) of revenue of the products in a drill-down. Also, the user creates a formula of "Revenue <1000" to determine products with a revenue of less than 1000. A relational operator delivers "1" for true and "0" for false. The user may also want to know how many products have a revenue less than 1000. The user then adds to the formula the aggregation of "SUM(over Product)" to count how many products have a revenue less than 1000. The following table summarizes the results:

TABLE 1

| Product | Revenue | Revenue <1000 |
| --- | --- | --- |
| Admete | 450 EUR | 1 |
| Agam | 1200 EUR | 0 |
| Grand Total | 1650 EUR | 1 |

As can be seen in Table 1, a grand total of products that have a revenue of less than 1000 is "1". An exception aggregation is used to make sure the grand total of 1 is calculated correctly. For example, a reference characteristic of "Product" assures that the values from the grand total are grouped by "Product". That is, the number of products is counted that have revenue less than 1000 in the grand total.

The user may also want to enhance the query to find out the top products and make the query more flexible. For example, the user may want to determine how many products have revenue greater than 1% of the total revenue. To determine this, the user uses a concept of constant selection to create a key figure of "Revenue CS Product" that determines the total revenue for all products (and not just one product). The constant selection operator is denoted by "CS" in the formula and removes the global filter, such as a "group-by" for the reference characteristic of Product in the calculation. Then, another formula calculates 1% of the total revenue and the last relational operator ">" is added. The example is summarized as follows in Table 2:

TABLE 2

| Product | Revenue | Revenue CS Product | 1% of Revenue CS Product | Revenue >1% of Revenue CS Product |
| --- | --- | --- | --- | --- |
| Admete | 450 EUR | 100.000 EUR | 1000 EUR | 1 |
| Agam | 1200 EUR | 100.000 EUR | 1000 EUR | 1 |
| Grand Total | 1650 EUR | 100.000 EUR | 1000 EUR | 2 |

As can be seen above in Table 2, the grand total of "2" is not what the user intended. However, the grand total is calculated correctly according to the rules followed by the database system. In the example, the product Admete has a revenue of 450 that is not greater than 1% of the total product revenue of 1000 EUR. Thus, the value should be "0" instead of "1". However, due to how the database evaluates the rules, the value for Admete is "1", and the grand total of "2" is received instead of "1". The following summarizes the query for Table 2.

SUM(Revenue>(0.01*(Revenue CS Product)) over Product

The intention of the query should be to count how many products have a revenue of more than 1% of the total revenue over all products. However, due to a principle of late aggregation, the analytical processing system (Online analytic processing system (OLAP system) does not evaluate the formula as the user desires. Rather, the constant selection (CS) on the characteristic of Product in "Revenue CS Product" removes the filter of the characteristic of Product, but the forced "group-by" from the exception aggregation "SUM" takes priority over the filter removal from CS due to the characteristic of Product being associated with the later calculation of "SUM". In this case, the revenue of the specific product is used instead of the revenue of all products. For example, the database system evaluates the formula for the Admete product as follows:

SUM, 450>(0.01*450) (in this case, 450 is always greater than 4.5).

In the above formula, the revenue for Admete product is used as the value for the key figure of Revenue CS Product instead of the total revenue of all products. This is because the analytical processing system does not honor the constant selection of Product in the key figure. Rather, the database system just uses the revenue of the Admete product without filtering a group by on the reference characteristic of Product.

SUMMARY

In one embodiment, a method receives a query for analyzing data in a database. The query includes a first level calculation that is performed before a second level calculation. When an operator associated with the first level calculation is present in the query, the method performs: calculating the first level calculation by removing group by information for a reference characteristic for the first level calculation to determine a first level calculation result and calculating the second level calculation using the first level calculation result using the group by information for the reference characteristic to determine a second level calculation result, wherein the group by in the second level calculation combines groups of rows in a database table of the database that have the same content in their specified columns.

In one embodiment, a non-transitory computer-readable storage medium contains instructions, that when executed, control a computer system to be configured for: receiving a query for analyzing data in a database, wherein the query includes a first level calculation that is performed before a second level calculation; determining when an operator associated with the first level calculation is present in the query; when the operator is present, performing: calculating the first level calculation by removing group by information for a reference characteristic for the first level calculation to determine a first level calculation result; and calculating the second level calculation using the first level calculation result using the group by information for the reference characteristic to determine a second level calculation result, wherein the group by in the second level calculation combines groups of rows in a database table of the database that have the same content in their specified columns.

In one embodiment, an apparatus includes: one or more computer processors; and a non-transitory computer-readable storage medium comprising instructions, that when executed, control the one or more computer processors to be configured for: receiving a query for analyzing data in a database, wherein the query includes a first level calculation that is performed before a second level calculation; determining when an operator associated with the first level calculation is present in the query; when the operator is present, performing: calculating the first level calculation by removing group by information for a reference characteristic for the first level calculation to determine a first level calculation result; and calculating the second level calculation using the first level calculation result using the group by information for the reference characteristic to determine a second level calculation result, wherein the group by in the second level calculation combines groups of rows in a database table of the database that have the same content in their specified columns.

The following detailed description and accompanying drawings provide a better understanding of the nature and advantages of particular embodiments.

BRIEF DESCRIPTION OF THE DRAWINGS

FIG. 3 shows an example for an exception aggregation according to one embodiment.

FIG. 6A shows an example of a formula using the FIX operator according to one embodiment.

FIG. 6B shows an example calculation using the FIX operator according to one embodiment.

FIG. 6C shows a table summarizing the query results according to one embodiment.

FIG. 7A depicts an example with an additional aggregation over the calendar month according to one embodiment.

FIG. 7B shows an example formula for the key figure in the last column of the table of FIG. 7A.

FIG. 8A shows an example where the revenue reference key figure is calculated as Revenue CS Product, CALMONTH according to one embodiment.

FIG. 8B shows the formula for a column shown in FIG. 8A.

FIG. 10 illustrates hardware of a special purpose computing machine configured with the analytical engine according to one embodiment.

DETAILED DESCRIPTION

Described herein are techniques for a database system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
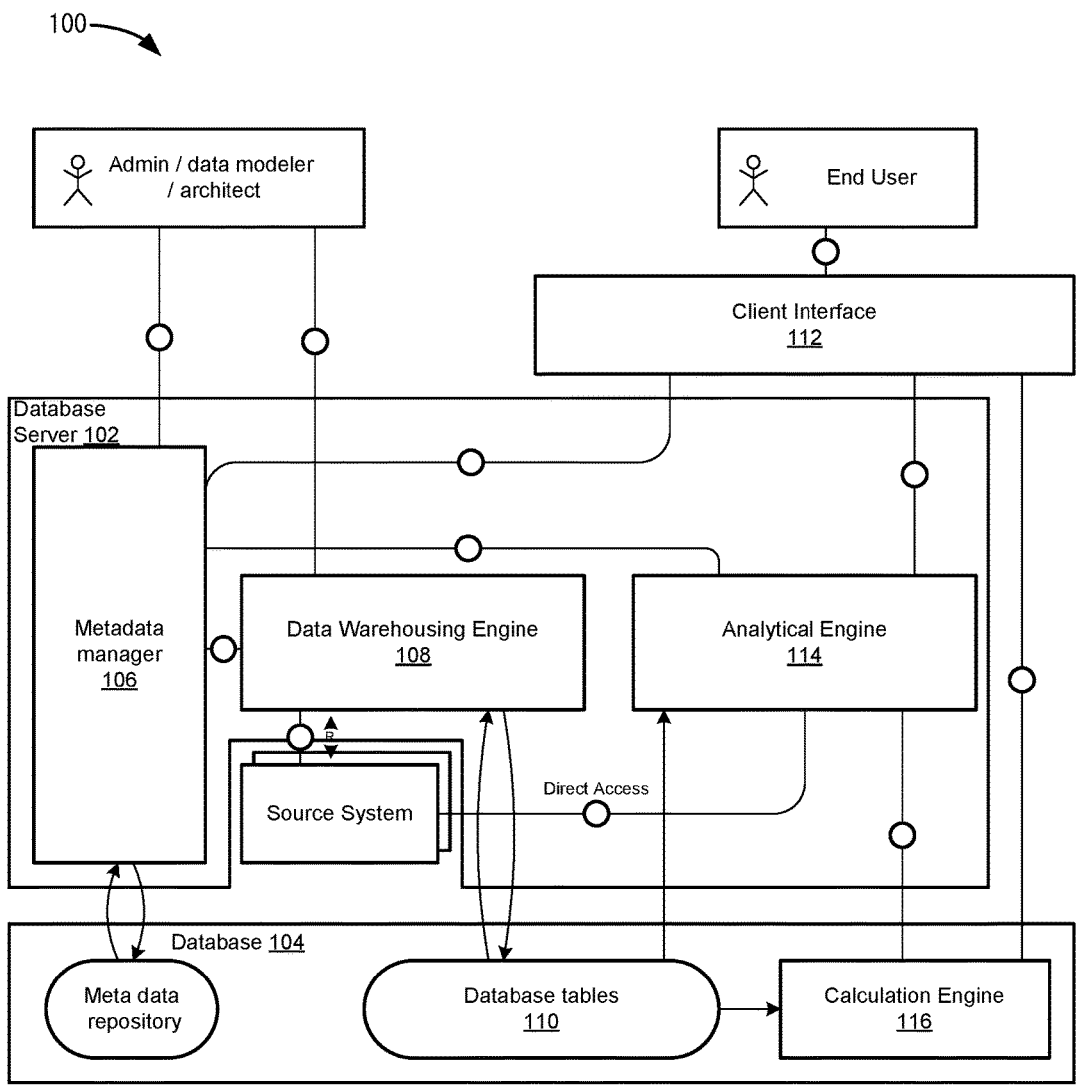
FIG. 1 depicts a simplified system for performing database operations according to one embodiment.

FIG. 1 depicts a simplified system 100 for performing database operations according to one embodiment. A database server 102 interacts with a database 104. An admin, data modeler, or a solution architect may model metadata in a metadata repository 103 for database 104 through a metadata manager 106. The metadata may include modeling what operators can be used in formulas in queries. Also, the metadata models the rules that an analytical engine 114 uses to calculate the results of the formulas in the queries.

A data warehousing engine 108 extracts and transforms data from sources 108, and stores the data in database tables 110 of database 104. Once the data is stored in database tables 110, an end user may use a client interface 112 to access the data. For example, the end user accesses an analytical engine 114 to perform queries on data stored in database tables 110. In one example, analytical engine 114 may interact with a calculation engine 116 that can perform additional operations to calculate results for the queries using data stored in database tables 110. The results from the queries are then output to the end user through client interface 112.

As will be described in more detail below, analytical engine 114 allows an end user to use a "FIX" operator in queries for data in database tables 110. The FIX operator removes a "group-by" for a reference characteristic at a first level calculation when the reference characteristic is used at a second level calculation. The first level calculation may be an inner calculation in a formula that is executed before an outer calculation in the formula. A group-by statement combines groups of rows in a database table that have the same content in their specified columns. In one embodiment, the FIX operator allows a user to specify behavior that overrules a database rule when the constant selection of the reference characteristic was not honored due to the principle of late aggregation. Before describing the FIX operator in more detail, aggregation in analytical engine 114 will be described.

Aggregation in the Analytical Engine

Analytical engine 114 aggregates defined key figures. The aggregation behavior determines whether and how key figure values are aggregated in reports for the end user using different characteristics or characteristic values. In order to calculate the values of key figures, the data from database tables 110 has to be aggregated to the detail level of the query and formulas may also need to be calculated. Analytical engine 114 may also have to aggregate over multiple characteristics.

Analytical engine 114 may use the concept of implicit aggregation, which means that analytical engine 114 aggregates over all characteristics/dimensions that are not explicitly mentioned in grouping/group-by characteristics. An exception aggregation group-by characteristic is an aggregation over a reference characteristic that is in the group-by clause and aggregates columns including the same content for that reference characteristic. The fewer characteristics that are mentioned (e.g., as part of a drill-down), the more a key figure gets aggregated. If no characteristics are to be considered, the result set just contains one cell containing the total aggregate. This works because each key figure has at least a standard aggregation rule defined in a model (i.e., there is no key figure without an aggregation rule).

Figure 2:
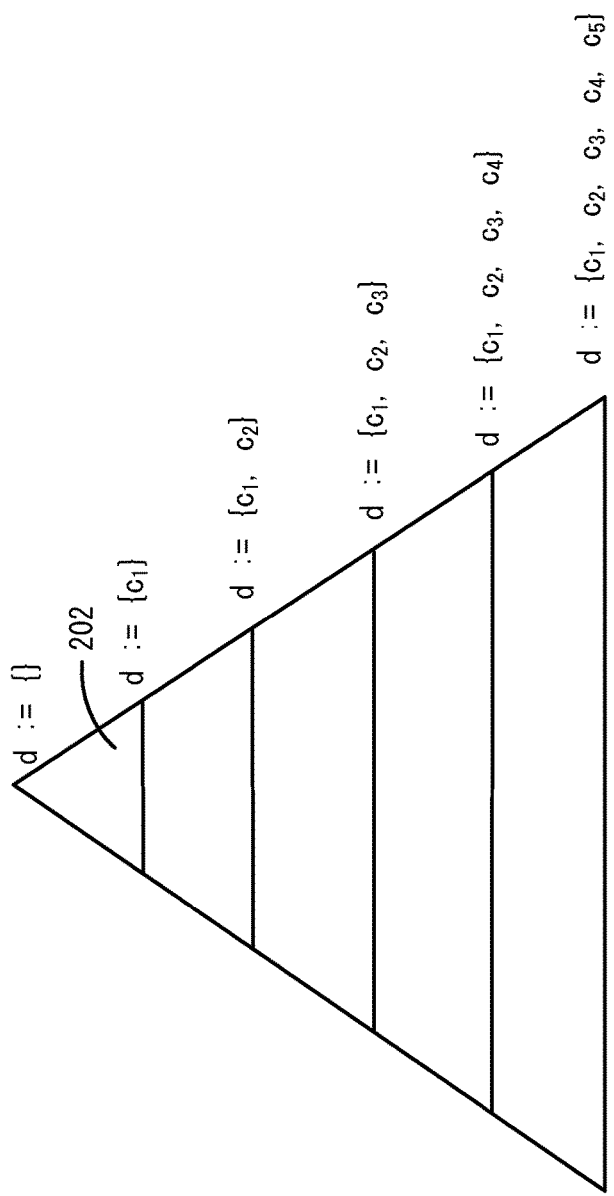
FIG. 2 shows a visualization of the aggregation in an analytical engine according to one embodiment.

FIG. 2 shows a visualization of the aggregation in analytical engine 114 according to one embodiment. Database tables 110 may be in the form of cubes of data that are referred to as info providers. Cubes of data may include any number of dimensions/characteristics. If the underlying cube is defined as a query cube (Q), characteristics are defined as $c_1, c_2, \ldots c_n$. The following constructs may be also followed by analytical engine 114:

An aggregation is called "aggregate function" in relational algebra

Aggregate functions are sometimes written using the Projection operator or the Script F character: $\mathcal{F}$ An Aggregation is written as $_{<groupingattribute>}\mathcal{F}_{<aggregationfunction>}(Q)$ Here the so called group-by clause comes into the game. Before the aggregation symbol the attributes/characteristics are defined that shall span the result.

The grouping attributes include the attributes/characteristics d and e. d are the attributes coming from the current drill-down, e is the exception aggregation reference characteristics, and d and e contain are subsets of the characteristics/attributes of the cube/infoprovider.

The aggregate functions are a combination of an aggregation rule a and a key figure k and written as a(k) (e.g., as in SUM(REVENUE)). The aggregate function together shall be called f, whereas f:=a(k).

The set that is aggregated is (Q).

An Aggregation is an extension to a projection. The resulting set has the degree as defined by the grouping attributes. It has a degree smaller or equal to the degree of the original set (Q).

Referring to FIG. 2, the set is aggregated depending on how many characteristics are defined in the drill-down. The last aggregation step is when no grouping attributes are taken into account. This result is then the grand total. As will be described in more detail below, the pyramid adheres to the principle of late aggregation. Late aggregation states that as long as a characteristic is mentioned as a grouping attribute in a later calculation step, it is not aggregated over the characteristic in the current calculation. That means in the pyramid shown in FIG. 2, an aggregation over $c_1$ only happens in the last step (the top aggregation step shown at 202).

The following will describe different aggregations that can be performed. The basic form of aggregation is standard aggregation. Standard aggregation can aggregate key figures using summation (SUM), minimum (MIN), and maximum (MAX) functions. Standard aggregation is independent from any specified dimensions/characteristics. Thus, standard aggregation aggregates over all characteristics not in the drill-down and also independent from their order. Standard aggregation may be referred to as the symbol script "F". This implies that the script F can only have the aggregation rules of A=(SUM, MIN, MAX). If only standard aggregation is used, only the drill-down characteristics are considered. So the query result is:

$$_d\mathcal{F}_f(\sigma(Q))$$

Another aggregation is referred to as exception aggregation. Exception aggregation includes aggregation rules that are dependent on a characteristic. Exception aggregation determines how a restricted, calculated key figure or a formula is aggregated in analytical engine 114 with respect to one or more reference characteristics. To calculate an aggregation with an exception aggregation rule, the exception aggregation needs to specify a characteristic that defines the granularity on which the basis of the aggregation rule is applied. The exception aggregation aggregates the key figures up to the defined granularity in the group-by characteristic via the standard aggregation. The exception aggregation is an addition to the standard aggregation and not a replacement. One example is the average (AVG) aggregation rule. The average is a sum divided by the number of entries. To determine the number of entries, analytical engine 114 defines a data granularity to what the multi-dimensional data needs to be aggregated and counted afterwards. The following describes different standard aggregation rules (only SUM/MIN/MAX) and exception aggregation rules (all below, including SUM, MIN, MAX) that may be used:

TABLE 3

| Abbreviation | Aggregation rule | Description |
| --- | --- | --- |
| AVG | Average of All Values | Average (all values) (AVG): The average of all values is displayed. |
| AV0 | Average of All Values <> 0 | Average (value not equal to zero) (AV0): After drilling down according to the reference characteristic, the average of the column values not equal to zero is displayed in the results row. |
| AV1 | Average Weighted with Calendar Days | Average (weighted with no. of days) (AV1): After drilling down according to the reference characteristic, the average of the column values weighted with the number of days is displayed in the results row. |

TABLE 3-continued

| Abbreviation | Aggregation rule | Description |
| --- | --- | --- |
| AV2 | Average Weighted with Working Days | Average (weighted with the number of workdays; factory calendar) (AV2): After drilling down according to the reference characteristic, the average of the column values weighted with the number of workdays is displayed in the results row. |
| CNT | Count All Values | Counter (all values) (CNT): The number of existing values is displayed in the results row. |
| CN0 | Count All Values <> 0 | Counter (value not equal to zero) (CN0): The number of values <> zero is displayed in the results row. |
| FIR | First Value | First value (FIR): The first value in relation to the reference characteristic is displayed in the results row. |
| LAS | Last Value | Last value (LAS): The last value in relation to the reference characteristic is displayed in the results row. |
| MAX | Maximum | Maximum (MAX): The maximum value of all values displayed in this column is displayed in the results row. |
| MIN | Minimum | Minimum (MIN): The minimum value of all values displayed in this column is displayed in the results row. |
| NGA | No Aggregation of Posted Nodes Along the Hierarchy | No aggregation of postable nodes along the hierarchy (NGA). |
| NHA | No Aggregation Along the Hierarchy | No aggregation along the hierarchy (NHA). |
| NO1 | Exception If More Than One Record Occurs | No aggregation (exception if more than one record arises) (NO1). |
| NO2 | Exception If More Than One Value Occurs | No aggregation (exception if more than one value arises) (NO2). |
| NOP | Exception If More Than One Value <> 0 Occurs | No aggregation (exception if more than one value <> 0) (NOP). |
| STD | Standard Deviation | Standard deviation (STD): After drilling down according to the reference characteristic, the standard deviation of the displayed values is displayed in the results row. |
| SUM | Total | Summation (SUM): The sum of all values displayed in this column is displayed in the results row. |
| VAR | Variance | Variance (VAR): After drilling down according to the reference characteristic, the variance of the displayed values is displayed in the results row. |

The following also describes aspects of exception aggregation:

The script G symbol $\mathcal{G}$ is used for the exception aggregation to show the different operations.

The exception aggregation adds additional reference characteristics (e) to the grouping attributes. $e := \{c_1, c_2, \ldots, c_n\}$.

So the grouping attributes are then d and e. Again d and e contain a subset of characteristics/attributes of the cube/infoprovider. Additionally d and e can contain any characteristics, independent from each other.

The grouping attributes e are not part of the exception aggregation $\mathcal{G}$ itself but in the included aggregation.

The exception aggregation also has aggregation functions called g, as they can have more aggregation rules, so g:=a'(k). a' contains all exception aggregation rules from Table 3.

An exception aggregation includes a standard aggregation or another exception aggregation. Therefore the reference characteristics e can easily added to the inner aggregation.

If standard and exception aggregation are used, the drill-down characteristics and the reference characteristics are considered. So the query result is (without considering subtotal levels):

$$\mathcal{G}_{d,e}\mathcal{F}_{g(d,e)}(\sigma(Q)))$$

Also, two exception aggregations may be stacked as follows:

$$\mathcal{G'}_{g'(d,e)}\mathcal{G}_{g(d,e',e)}\mathcal{F}_{f}(\sigma(Q))))$$

As can be seen, the grouping characteristics of the outer exception aggregation are pushed down to the innermost aggregation. If e and e' contain equal characteristics, the principle of late aggregation in the inner aggregation does not allow the aggregation over that characteristic. In addition to the exception aggregation rules and the definition, the following example is used to describe why there should be a certain order of standard and exception order of aggregations. FIG. 3 shows an example for an exception aggregation according to one embodiment. At 302, a table lists example data. Also, at 304, results for an example query are provided. The results show different types of aggregations and key figure types as follows:

1. Net Sales: At 306, this is a basic key figure with standard aggregation SUM, so the Total at 308 is a plain sum. Referring to the basic data for the example it is just the sum of all Net Sales column irrespective to any characteristic values.

2. Number of Customers: At 310, this is a key figure with an exception aggregation. To calculate the correct Total at 312 it is necessary to consider the characteristic values of the characteristic "Customer" at 314. As customer "Peter" and "Andi" in Table 302 are both in the "US" and in "DE" there is a count distinct with regard to column "Customer" in the basic data to calculate the right total.

3. AVG Sales per Customer: At 316, this is a calculated key figure, the formula is defined as a division of Net Sales by Number of Customers. Here it is necessary that the formula is calculated on the correct subtotal level. The formula is calculated after the aggregation, so on the detail rows, it takes the details as input, on the total rows other totals are the input.

4. Number of Customers in January: This is a restricted key figure, it is the Number of Customers but restricted to the Month January. Here the data must be filtered before the aggregation and then like the "Number of Customers" key figure, the distinct customer with regard to the Customer column has to be considered.

The example shown in FIG. 3 shows that the order of the calculations is important to get a clear and correct result. This is why analytical engine 114 first processes the standard aggregation up to the requested level and then afterwards processes the exception aggregation.

The formula calculation will be explained before the formula exception aggregation. An example of a formula calculation may be as follows:

$$o_1 \circ o_2$$

or in case of a single-operand operator:

$$\circ o_1$$

A formula normally contains at least two operands and an operator that connects the two operands. However, a formula may only contain an operator and an operand. Formulas can also be stacked. An operand o is either a key figure of an info provider/cube (Q), a constant, or another formula. Also, an operand that is a key figure is an aggregation result represented by:

$$_d\mathcal{F}_f(\sigma(Q)) \text{ or } _d\mathcal{G}_{f_{d,e}}\mathcal{F}_f(\sigma(Q))).$$

Figure 4A:
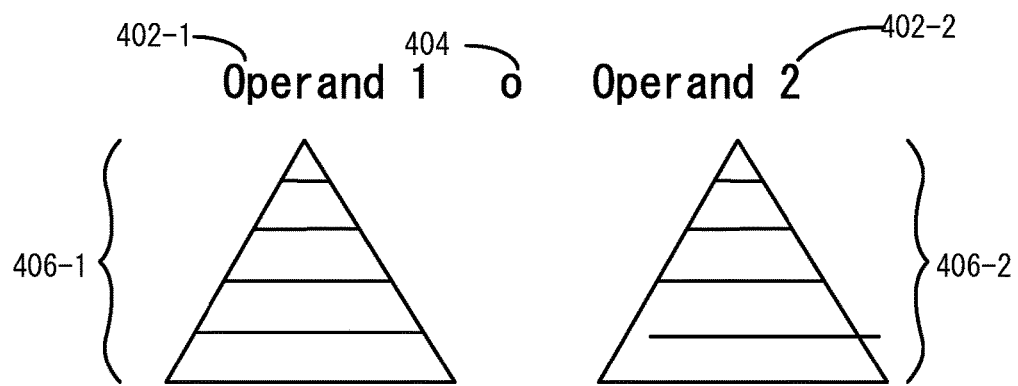
FIG. 4A shows an example of a formula operating on completely aggregated data according to one embodiment.

This means that before the formula calculation is performed, the standard aggregation and the exception aggregation occur. FIG. 4A shows an example of a formula operating on completely aggregated data according to one embodiment. At 402-1, a first operand, Operand 1, is shown, and at 402-2, a second Operand, Operand 2, is shown. At 404, an operator connects Operand 1 and Operand 2.

The aggregations are represented at 406-1 for Operand 1 and 406-2 for Operand 2. The formula calculation works on scalars (i.e., single values). The formula operates on completely aggregated data. That is, no other aggregation steps need to be performed for the formula. The formula calculation can be represented as an operation τ that works on a set Q. So τ(Q) may be represented as:

$$\mathcal{T}\ (_d\mathcal{F}_f(\sigma(Q))) \text{ or } \mathcal{T}\ (_d\mathcal{G}_{g(d,e)}\mathcal{F}_f(\sigma(Q)))).$$

In another example, after the formula is calculated, an extra exception aggregation step may be added. This may be represented as:

$$_d\mathcal{G}'_g(\mathcal{T}\ (_{d,e}\mathcal{G}_{g(d,e',e)}\mathcal{F}_f(\sigma(Q))))).$$

This means that the formula is no longer calculated as a complete aggregated set (e.g., a scalar), but now on a set that still has grouping attributes. The formula is calculated and then the results of the formula are used in an aggregation. This may be represented by a vector spanned by the grouping characteristics of the formula exception aggregation.

Figure 4B:
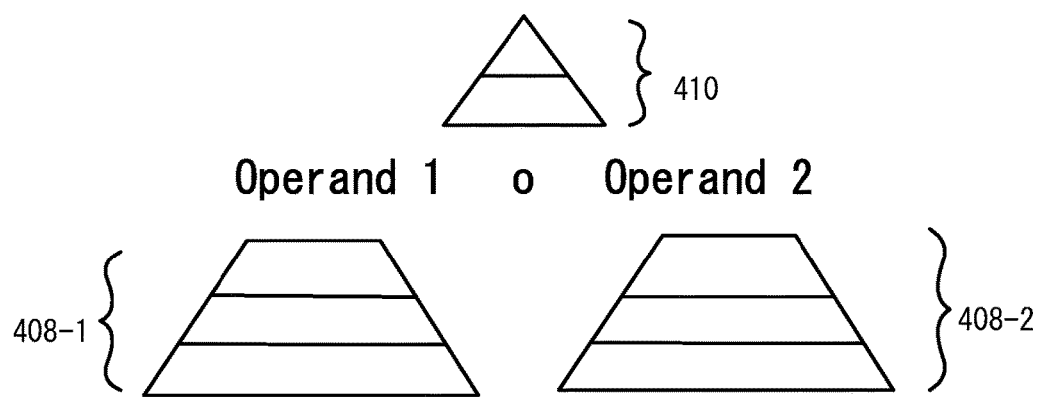
FIG. 4B shows an example of a formula with later aggregation steps according to one embodiment.

FIG. 4B shows an example of a formula with later aggregation steps according to one embodiment. At 408-1 and 408-2, a formula calculation is performed by performing standard aggregation. The standard aggregation operates on data that is not completely aggregated. Then, after the formula calculation, the result of the formula calculation is aggregated, which is represented at 410. Both operands, operand 1 and operand 2, have the same grouping attributes as described above with respect to FIG. 4A. Both operands are connected via the operator, but consider the key (the values of the grouping attributes) of both vector elements.

Figure 5:
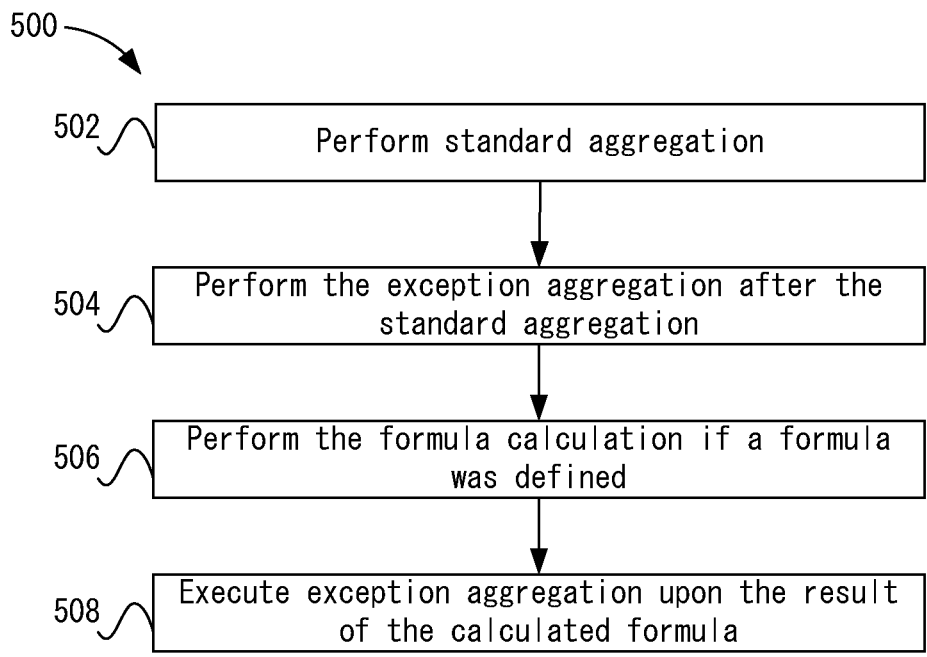
FIG. 5 depicts a simplified flowchart that shows the steps of aggregation according to one embodiment.

FIG. 5 depicts a simplified flowchart 500 that shows the steps of aggregation according to one embodiment. At 502, analytical engine 114 performs standard aggregation. Standard aggregation may be performed with the options of SUM, MIN, and MAX. Although not shown, a currency and unit conversion may also take place. The currency and unit conversion may convert the aggregation results between currencies.

At 504, if exception aggregation is set up, analytical engine 114 performs the exception aggregation after the standard aggregation. Exception aggregation includes options such as SUM (default), MIN, MAX, AVG, FIRST, LAST, NOP, COUNT, STANDARD DEVIATION, VARIANCE, etc. Another currency/unit aggregation may also be performed again as another aggregation was performed in the exception aggregation.

At 506, analytical engine 114 performs the formula calculation if a formula was defined. Currency and unit handling may also be performed here.

After the formula calculation, at 508, analytical engine 114 may execute exception aggregation upon the result of the calculated formula. This may be the same step as the exception aggregation executed before, but the formula exception aggregation operates on the formula results. Additionally, currency/unit aggregation may be performed during the formula exception aggregation. As will be discussed below, the FIX operator may be used in the formula exception aggregation.

As discussed above, even in the cases where the reference characteristic is not included in the query explicitly, analytical engine 114 executes the aggregation implicitly using the reference characteristic. In other words, the standard aggregation does not aggregate over the reference characteristics of the later exception aggregation because these characteristics are in the group-by clause. It is also possible to stack formulas with the exception aggregation. In this case, the principle of late aggregation also applies to the stacked formulas. If there is an exception aggregation defined in an outer formula with the same reference characteristic and it is used in an inner exception aggregated formula, the inner aggregation is not executed over the equal characteristics.

To understand the principle of late aggregation, the following example is used. Referring back to Table 1 of the Background, the grand total value is 1. The following formula may be defined as the grand total:

SUM(Revenue<1000) over Product

The exception aggregation means that the input data set for the SUM aggregation is grouped by the reference characteristic. This means that the exception aggregation is grouped by the reference characteristic of "Product", so e=(Product). This makes sure that there is a vector spanned over Product as follows:

(Product) Revenue<1000=$X$ (Admete) 450 EUR<1000=1

(Agam) 1200EUR<1000=0

In the above, the formula evaluates whether revenue for a product is less than 1000. Then, the aggregation of the result is performed as follows:

SUM(0,1)=1

The SUM formula is basically adding up the number of products that have a revenue of less than 1000. Without the late aggregation principle, the vector would not be spanned. That is, the value would be aggregated according to the standard aggregation rule, and then the formula would be calculated. In this case, the SUM afterwards would not be the result desired by the user. That is, the result would be calculated as follows:

SUM(1650 EUR<1000)=0

In this case, the revenue was aggregated without using the reference characteristic of Product and resulted in a value of 1650, which is the value of the aggregated revenue for all products. This results in a result not desired by the user. To address this, a user may use constant selection.

Constant Selection in Analytical Engine 114

An end user may define a principle of constant selection in a key figure. For example, the key figure itself may be marked as constantly selected (CSE) or a single characteristic may be constantly selected for this key figure (CSC). Constant selection defines a characteristic where no filtering or grouping is performed for the associated key figure. The two constant selection types CSE and CSC affect the selection $\sigma_0 \ldots \sigma_n$. Also, $\sigma_n$ is not affected as it is an explicit setting in the key figure itself. In the case of CSE, all conditions in $\sigma_0$ are removed so if CSE is active, $\sigma(Q)=\sigma_n(Q)$. CSC only removes the selection conditions in $\sigma_0$ that are related to the defined characteristics. Both constant selection types also affect the drill-down characteristics in d. If CSC is selected, all characteristics in d are removed so d:={ }. If CSE is selected, the chosen characteristics/attributes are omitted in d. Table 3 shows an example using constant selection:

TABLE 3

| Product | Revenue | Revenue CS Product |
|---|---|---|
| Admete | 450 EUR | 100.000 EUR |
| Agam | 1200 EUR | 100.000 EUR |
| Grand Total | 1650 EUR | 100.000 EUR |

There are two key figures in Table 3 of "Revenue" and "Revenue CS Product". "Revenue CS Product" is the key figure "Revenue", but with constant selection (e.g., CSC) active on the characteristic of "Product". There are no selections so that selection σ is empty. This means that analytical engine 114 removes Product from d. The aggregation result means that the Revenue with the Product group-by removed is the Revenue for all products. Thus, the aggregation result is 100.000 EUR. By removing the selection $\sigma_0$ in the grouping d, the value of the key figure "Revenue CS Product" is the total over all products. Also, the drill-down by Product and the existence of the results at tuples "Admete" and "Agam" only come from the key figure Revenue. The key figure Revenue CS Product does not have any drill-down characteristics. The result set may be represented as follows:

$R = _{Product}\mathcal{F}_{Sum\ (Revenue)}(Q) \bowtie \mathcal{F}_{Sum\ (Revenue)}(Q)$ While the use of constant selection works as described above, when exception aggregation and constant selection are used, results the user may not desire occur again.

Exception Aggregation and Constant Selection

When exception aggregation and constant selection are used together, a conflict results due to the principle of late aggregation. As described above, a key figure value is affected by the selection σ(Q). Also, constant selection affects the components of σ(Q) and d. That is, CSC removes $\sigma_0(Q)$ and d completely. Also, CSC removes some characteristic conditions of $\sigma_0(Q)$ and some grouping attributes of d. As described above, the following is true:

$_d\mathcal{F}_f(\sigma_{0\wedge\eta}(Q))$

Also, constant selection affects $\sigma_0$ and d. If an exception aggregation is added, the following is true:

$_d^{\mathcal{E}}\mathcal{f}_{d,e}\mathcal{F}_f(\sigma_{0\wedge\eta}(Q)))$

In the above, an extra set of grouping attributes applies to the data read from database tables 110. If constant selection is applied, this will affect $\sigma_0(Q)$ and d, but not the grouping attribute e. That means the reference characteristic is in the "group-by" clause of the selected data. Thus, the exception aggregation here overrules the constant selection. That is, the constant selection of the characteristic is not performed due to the exception aggregation including the same characteristic. Removing the characteristic from the group-by clause would affect the result of the exception aggregation and would also violate the principle of late aggregation. If the grouping characteristic e is removed, a later exception aggregation is no longer possible because the reference characteristic is needed due to certain aggregation rules.

The following illustrates the use of the formula exception aggregation and constant selection. Constant selection affects the selection only and has no effect on the order and level of aggregation and formula calculation. Continuing with the example described above, Table 4 shows an exception aggregation with constant selection.

TABLE 4

| Product | Revenue | Revenue CS Product | 1% of Revenue CS Product | Revenue >1% of Revenue CS Product |
|---|---|---|---|---|
| Admete | 450 EUR | 100.000 EUR | 1000 EUR | 1 |
| Agam | 1200 EUR | 100.000 EUR | 1000 EUR | 1 |
| Grand Total | 1650 EUR | 100.000 EUR | 1000 EUR | 2 |

In Table 4, the key figure "Revenue >1% of Revenue CS" has the aggregation rule SUM over Product. Thus, Product is part of e and basically the two vectors that are input to the formula are as follows:

(Product) Revenue>(Product) 0.01*Revenue CS Product (Admete) 450 EUR>(Admete) 0.01*450 EUR(CS Product)

(Agam) 1200 EUR>(Agam) 0.01*1200 EUR(CS Product)

Due to the formula exception aggregation, the formula operands are spanned vectors with the reference characteristic of Product. The constant selection is executed after the aggregation, but as the constant selection does not affect e, the result can never be correct as X>0.01*X is always true. Because of the principle of late aggregation, this is the result that occurs. As long as the aggregation rule of "Revenue >1% of Revenue CS" has the reference characteristic of "Product", the constant selection of Product is not honored as the reference characteristic of Product is used in a later exception aggregation. Thus, the reference characteristic Product is not removed from the above key figure and the key figure of "Revenue >1% of Revenue CS Product" is the revenue of the specific product and not the total revenue of all products. For example, Admete uses the revenue of 450 EUR and Agam uses the revenue of 1200 EUR instead of the total revenue of 1650 EUR for both Admete and Agam. To address the above conflict, particular embodiments provide a FIX operator for use in a query.

FIX Operator

The FIX operator may be added to the above formula as an operator. The following shows the correct results that a user intended in Table 5:

| Product | Revenue | Revenue CS Product | 1% of Revenue CS Product | Revenue >1% of Revenue CS Product |
|---------|---------|--------------------|--------------------------|-----------------------------------|
| Admete  | 450 EUR | 100.000 EUR        | 1000 EUR                 | 0                                 |
| Agam    | 1200 EUR| 100.000 EUR        | 1000 EUR                 | 1                                 |
| Grand Total | 1650 EUR | 100.000 EUR    | 1000 EUR                 | 1                                 |

Analytical engine 114 then calculates the following when the FIX operator is used:

(Admete) 450 EUR>0.01*SUM(100.000 EUR)

(Agam) 1200 EUR>0.01*SUM(100.000 EUR)

In the above, the principle of late aggregation is omitted due to the use of the FIX operator. That is, the key figure Revenue >1% of Revenue CS Product has been summed over the Total Product, and not just the restricted Product (e.g., just the Product Admete).

The FIX operator omits the principle of late aggregation explicitly. However, when the FIX operator is not included, then the principle of late aggregation applies. In omitting the principle of late aggregation, the FIX operator takes away a "group-by" clause for the exception aggregation and thus allows the constant selection to be executed without regard to the formula exception aggregation rule. The FIX operator thus fixates the aggregation context. The FIX operator also affects one single exception aggregation and only removes the group-by clause for the reference characteristic that is defined in the formula itself. The following may also be true for the FIX operator according to one embodiment:

1. The FIX operator avoids the spanning of a vector due to the reference characteristic of the exception aggregation. This removes automatically the grouping attributes e of the formula exception aggregation.
2. The FIX operator shall only remove the grouping attributes of the enclosed formula exception aggregation. Therefore the FIX operator may work in a formula with formula exception aggregation.
3. The FIX operator may remove the group-by of its operand.
4. The result is then a vector with a reduced set of grouping attributes. If all grouping attributes where removed by the FIX operator it is a scalar.
5. The aggregation rule that applies (due to the implicit aggregation) to the fixed operand is derived from the operand context, not from the current formula.
6. This result of the FIX operator is then the input for the further processing.
7. The FIX operator practically does a dimensional roll-up operation.
8. Stacked formulas are not affected.
9. A pre-check in query designer/query modeling tool may be needed.
10. The FIX operator shall work with multidimensional formula exception aggregation.
11. The definition of the formula and the formula exception aggregation other than that should not be touched.

FIG. 6A shows an example of a formula using the FIX operator according to one embodiment. In this example, the FIX operator is a single operand operator referred to as FIX(X). At 602, the FIX operator operates on the formula of 0.01*(Revenue CS Product). At 604, the exception aggregation SUM is summing over the reference characteristic of Product. Also, at 606, the inner formula is also aggregated over the reference characteristic of Product. Thus, due to the principle of late aggregation, the group-by for the reference characteristic of Product normally could not be removed from the inner formula calculation. However, using the FIX operator, the group-by for the reference characteristic of Product is removed for the inner formula shown at 602. This results in the group-by for Product being removed and thus the total Revenue for all products is used for the key figure of Revenue CS Product. In other words, the constant selection of Product is honored due to the use of the FIX operator. For example, FIG. 6B shows an example calculation using the FIX operator according to one embodiment. As shown at 608, the grand total of 100.000 EUR is included for the key figure of Revenue CS Product. In this case, the group-by for the reference characteristic of Product has been removed and analytical engine 114 calculates the total revenue for all products for Revenue CS Product. Thus, the Revenue filtered by the group-by of Product is not used here.

FIG. 6C shows a table summarizing the query results according to one embodiment. At 610, the key figure Revenue CS Product shows a total of 100.000 EUR. The use of the FIX operator removes the group-by of the Product for each cell shown in the column. Thus, the revenue is 100.000 EUR at 612 instead of 450 EUR, and at 614, the revenue is 100.000 EUR instead of 1200 EUR. The revenue of 450 EUR would be used at 612 as the revenue of the product Admete when the principle of late aggregation is honored instead of 100.000 EUR, and similarly, the revenue of 1200 would be used at 614 as the revenue of Agam. Additionally, as shown at 616, 1% of Revenue CS Product is 1000 EUR for both the products Admete and Agam. Thus, the group-by of Product has been removed in this formula as 1% of 100.000 EUR is 1000 EUR. This is different from the prior results of 4.5 EUR and 12 EUR that were received before the use of the FIX operator. In a column shown at 618, the correct results for the formula Revenue >1% of Revenue CS Product are received as the Product Admete does not have a Revenue >1% of the total revenue for all products, 450!>1000, and thus a "0" is determined at 620, but the product Agam does have a Revenue >1% of the total revenue for all products, 1200 EUR>1000, and a "1" is shown at 622. The SUM for the number of products is then shown at 624. The SUM is grouped by the reference characteristic of Product in this case. That is, analytical engine 114 does not remove the reference characteristic of Product from the second level calculation as the Fix operator only affects the first level calculation. The FIX operator only affects the direct exception aggregation reference characteristic of the defined formula.

FIG. 7A depicts an example with an additional aggregation over the calendar month according to one embodiment. The example adds an additional key figure SUM (Revenue >1% of Revenue CS Product) over CALMONTH. CALMONTH may be the reference characteristic of calendar month. This means an additional exception aggregation is stacked—SUM over CALMONTH. For discussion purposes, there is a restriction on CALMONTH of 04.2004 and 05.2004.

FIG. 7B shows an example formula for the key figure in the last column of the table of FIG. 7A. In FIG. 7B, at 704, the FIX operator only removes the group-by for Product as this is the corresponding reference characteristic of the sub-formula. Analytical engine 114 does not remove the group-by over CALMONTH. Analytical engine 114 is able to deal with the vectors of different dimensionality (e.g., different grouping attributes).

In another example, an exception aggregation may be defined inside the FIX operator. The following example may enhance the reference key figure where it is now 1% of the average revenue of all products per month. The formula is:

AVG(0.01*(Revenue CS Product)) over Calmonth

The use of the FIX operator may now adjust the formula as follows:

SUM(Revenue>FIX(AVG(0.01*(Revenue CS Product)) over Calmonth)) over Product.

The FIX operator makes sure that the inner aggregation is happening as defined by the inner formula. That is, the reference characteristic of Product is removed from the calculation. The aggregation over Product from the second level (e.g., outer) aggregation does not affect the aggregation.

The examples in FIGS. 7A and 7B may also be enhanced. FIG. 8A shows an example where the revenue reference key figure is calculated as Revenue CS Product, Calendar Month according to one embodiment. The restriction on Calendar Month from the example before does not affect the reference key figure. The comparison key figure is now Revenue >1%$_0$ as a stacked exception aggregation of SUM (SUM (X) over Product) over Calendar Month. FIG. 8B shows the formula for the column shown at 802 in FIG. 8A. At 804, because multiple reference characteristics are provided at 806 of Product and Calendar Month, the FIX operator makes sure that both reference characteristics are removed. The results are calculated always against the full reference figure and with the starting key figure in the complete granularity.

Figure 9:
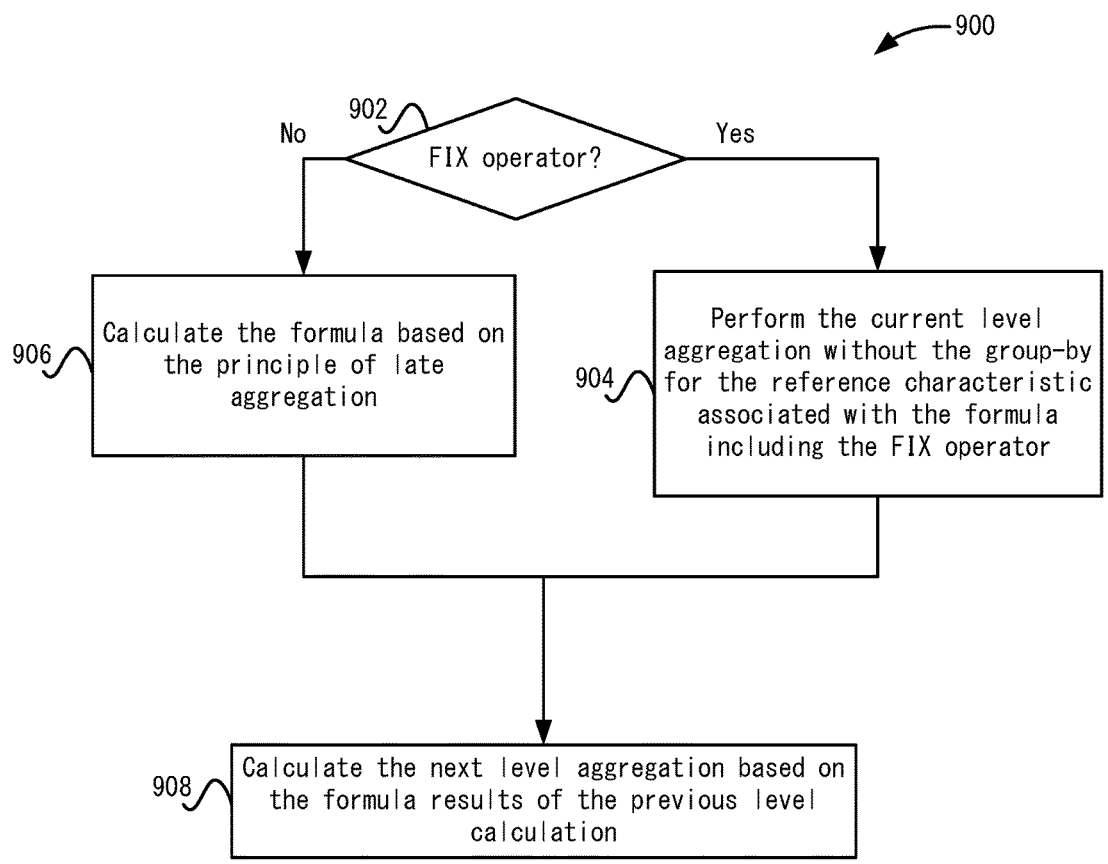
FIG. 9 depicts a simplified flowchart of a method for using the FIX operator according to one embodiment.

FIG. 9 depicts a simplified flowchart of a method for using the FIX operator according to one embodiment. At 902, analytical engine 114 determines a formula includes the FIX operator. At 904, if the formula includes the FIX operator, then the first level aggregation is performed without the group-by for the reference characteristic associated with the formula including the FIX operator. If the FIX operator is not included, then the formula is calculated based on the principle of late aggregation. At 908, analytical engine 114 calculates the second level aggregation based on the formula results of the previous level calculation. At 910, analytical engine 114 outputs the results.

It should be noted that although the FIX operator is discussed with respect to the constant selection, the FIX operator may also be used without constant selection.

FIG. 10 illustrates hardware of a special purpose computing machine configured with analytical engine 114 according to one embodiment. An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable storage mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information through the network interface 1004 across a local network 1020, an Intranet, or the Internet 1030. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a query for analyzing data in a database, wherein the query includes a first level calculation that is performed before a second level calculation, and wherein a reference characteristic is included in the first level calculation and the second level calculation;
   determining, by the computing device, that an operator associated with the first level calculation is present in the query, wherein the operator is specified to operate on the first characteristic in the first level calculation;
   calculating, by the computing device, the first level calculation by having the operator remove a group by clause for the reference characteristic from the first level calculation to determine a first level calculation result whereby the group by clause is not used in the first level calculation; and
   calculating, by the computing device, the second level calculation using the first level calculation result using the group by clause for the reference characteristic to determine a second level calculation result, wherein the group by in the second level calculation combines groups of rows in a database table of the database that have the same content in their specified columns.

2. The method of claim 1, wherein a rule indicates the group by clause for the reference characteristic for the first level calculation cannot be removed, wherein the operator being present overrides the rule.

3. The method of claim 1, wherein:
   the first level calculation includes a constant selection of the reference characteristic to remove the group by of the reference characteristic at the first level calculation, and
   the constant selection of the reference characteristic is used despite a rule specifying the group by clause of the reference characteristic should not be removed by the first level calculation.

4. The method of claim 3, wherein the operator removes the group by of the reference characteristic by the constant selection thereby overriding the rule.

5. The method of claim 3, wherein the rule is invoked when the second level calculation includes the group by clause for a same reference characteristic as the reference characteristic specified by the constant selection in the first level calculation.

6. The method of claim 1, wherein the second level calculation comprises an exception aggregation that uses the first level calculation result in performing the second level calculation, and wherein the exception aggregation performs the second level calculation by aggregating by the reference characteristic to determine the second level calculation result.

7. The method of claim 1, wherein the group by clause for the reference characteristic for the first level calculation to determine a first level calculation is removed for each cell in a column for the reference characteristic.

8. The method of claim 1, wherein the operator does not remove the group by clause for the reference characteristic in determining the second level calculation result.

9. The method of claim 1, wherein the operator is specified to operate on a formula for the first level calculation that includes the reference characteristic.

10. The method of claim 1, wherein the reference characteristic references a column in the database table.

11. The method of claim 1, wherein:
    the operator is specified to operate on an inner formula for the first level calculation that includes the reference characteristic,
    the operator is not specified to operate on an outer formula for the second level calculation that includes the reference characteristic.

12. A non-transitory computer-readable storage medium containing instructions, that when executed, control a computer system to be configured for:
    receiving a query for analyzing data in a database, wherein the query includes a first level calculation that is performed before a second level calculation, and wherein a reference characteristic is included in the first level calculation and the second level calculation;
    determining that an operator associated with the first level calculation is present in the query, wherein the operator is specified to operate on the first characteristic in the first level calculation;
    calculating the first level calculation by having the operator remove a group by clause for the reference characteristic from the first level calculation to determine a first level calculation result whereby the group by clause is not used in the first level calculation; and
    calculating the second level calculation using the first level calculation result using the group by clause for the reference characteristic to determine a second level calculation result, wherein the group by in the second level calculation combines groups of rows in a database table of the database that have the same content in their specified columns.

13. The non-transitory computer-readable storage medium of claim 12, wherein a rule indicates the group by clause for the reference characteristic for the first level calculation cannot be removed, wherein the operator being present overrides the rule.

14. The non-transitory computer-readable storage medium of claim 12, wherein:
    the first level calculation includes a constant selection of the reference characteristic to remove the group by of the reference characteristic at the first level calculation, and the constant selection of the reference characteristic is used despite a rule specifying the group by clause of the reference characteristic should not be removed by the first level calculation.

15. The non-transitory computer-readable storage medium of claim 14, wherein the operator removes the group by of the reference characteristic by the constant selection thereby overriding the rule.

16. The non-transitory computer-readable storage medium of claim 14, wherein the rule is invoked when the second level calculation includes the group by clause for a same reference characteristic as the reference characteristic specified by the constant selection in the first level calculation.

17. The non-transitory computer-readable storage medium of claim 12, wherein the second level calculation comprises an exception aggregation that uses the first level calculation result in performing the second level calculation, and wherein the exception aggregation performs the second level calculation by aggregating by the reference characteristic to determine the second level calculation result.

18. The non-transitory computer-readable storage medium of claim 12, wherein the group by clause for the reference characteristic for the first level calculation to determine a first level calculation is removed for each cell in a column for the reference characteristic.

19. non-transitory computer-readable storage medium of claim 12, wherein the operator is specified to operate on a formula for the first level calculation that includes the reference characteristic.

20. An apparatus comprising:

one or more computer processors; and a non-transitory computer-readable storage medium comprising instructions, that when executed, control the one or more computer processors to be configured for:

receiving a query for analyzing data in a database, wherein the query includes a first level calculation that is performed before a second level calculation, and wherein a reference characteristic is included in the first level calculation and the second level calculation;

determining that an operator associated with the first level calculation is present in the query, wherein the operator is specified to operate on the first characteristic in the first level calculation;

calculating the first level calculation by having the operator remove a group by clause for the reference characteristic from the first level calculation to determine a first level calculation result whereby the group by clause is not used in the first level calculation; and calculating the second level calculation using the first level calculation result using the group by clause for the reference characteristic to determine a second level calculation result, wherein the group by in the second level calculation combines groups of rows in a database table of the database that have the same content in their specified columns.

* * * * *